(12) United States Patent
Gulati

(10) Patent No.: US 9,036,450 B2
(45) Date of Patent: May 19, 2015

(54) GENERATING AN IMAGE OF A SUBTERRANEAN STRUCTURE

(75) Inventor: Jitendra S. Gulati, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 500 days.

(21) Appl. No.: 13/024,859

(22) Filed: Feb. 10, 2011

(65) Prior Publication Data
US 2011/0249531 A1 Oct. 13, 2011

Related U.S. Application Data

(60) Provisional application No. 61/323,002, filed on Apr. 12, 2010.

(51) Int. Cl.
G01V 1/00 (2006.01)
G01V 1/28 (2006.01)

(52) U.S. Cl.
CPC ...................................... *G01V 1/282* (2013.01)

(58) Field of Classification Search
USPC ........................................................... 367/73
See application file for complete search history.

(56) References Cited

U.S. PATENT DOCUMENTS

| | | | | |
|---|---|---|---|---|
| 4,888,742 A | * | 12/1989 | Beasley | 367/53 |
| 5,206,837 A | * | 4/1993 | Beasley et al. | 367/38 |
| 5,388,044 A | * | 2/1995 | Hepp | 702/10 |
| 5,450,370 A | * | 9/1995 | Beasley et al. | 367/53 |
| 5,596,547 A | * | 1/1997 | Bancroft et al. | 367/51 |
| 5,671,136 A | * | 9/1997 | Willhoit, Jr. | 702/18 |
| 5,677,893 A | * | 10/1997 | de Hoop et al. | 367/50 |
| 5,852,588 A | * | 12/1998 | de Hoop et al. | 367/38 |
| 6,016,462 A | * | 1/2000 | Schneider et al. | 702/14 |
| 6,311,131 B1 | * | 10/2001 | Peardon et al. | 702/14 |
| 6,418,379 B1 | * | 7/2002 | Bloor et al. | 702/17 |
| 7,599,798 B2 | * | 10/2009 | Beasley et al. | 702/17 |
| 2005/0201203 A1 | * | 9/2005 | Goloshubin et al. | 367/47 |
| 2009/0323471 A1 | * | 12/2009 | Wang | 367/27 |

OTHER PUBLICATIONS

Zhou utam.gg.utah.edu/tomo95/mid.rep/zhou.ps, Nov. 1, 1995, pp. 1-14.*
Moore, G. F. et al., "Integration of Vertical Seismic Profiling, Logging, and Seismic Data in the Vicinity of the Decollement, Northern Barbados Ridge Accretionary Prism", Proceedings of the Ocean Drilling Program, Scientific Results, vol. 156, 1997, pp. 255-262.

* cited by examiner

*Primary Examiner* — Isam Alsomiri
*Assistant Examiner* — Hovhannes Baghdasaryan

(57) ABSTRACT

Different values of at least one migration parameter are selected. An imaging technique is applied a plurality of times, where each application of the imaging technique uses a corresponding different one of the different values. Each application of the imaging technique produces a corresponding image of a subterranean structure. An aggregate of the images is computed to produce an output image of the subterranean structure.

17 Claims, 3 Drawing Sheets

GENERATING AN IMAGE OF A SUBTERRANEAN STRUCTURE

CROSS REFERENCE TO RELATED APPLICATIONS

This application claims the benefit under 35 U.S.C. §119(e) of U.S. Provisional Application Ser. No. 61/323,002, entitled "Method for Obtaining a Seismic Image Using Migration Process," filed Apr. 12, 2010, which is hereby incorporated by reference.

BACKGROUND

Data acquisition, processing, and imaging techniques are used to provide imaging of a region of a subterranean structure, to assist in identifying elements of interest in the subterranean structure, such as hydrocarbon reservoirs or other subterranean elements of interest. Vertical seismic profiling (VSP) is one type of a seismic data acquisition, processing, and imaging technique. Seismic data acquisition refers to using seismic sources to produce seismic waves that are propagated into the subterranean structure, with seismic receivers used to detect reflected seismic waves from which seismic data is collected. Other techniques can be used for imaging a subterranean structure, based on seismic data and/or based on electromagnetic (EM) data. EM data can be acquired by using EM sources and EM receivers.

A challenge in performing imaging, such as imaging based on use of the VSP technique, is the proper selection of migration parameters (e.g., aperture, dip, azimuth, velocity, etc.) that best solve the imaging problem under consideration. Migration can be used to move dips and/or other subterranean features to positions that are closer to their true positions in the subterranean structure when survey data (e.g., acquired seismic data or EM data) is rendered to an image. The selection of migration parameters is typically a manual process that relies upon knowledge regarding the geology of the subterranean structure and experience of the analyst. Such manual selection of the proper values for migration parameters can be time consuming and can be error prone.

SUMMARY

In general, according to some embodiments, different values of at least one migration parameter are selected. An imaging technique is applied a plurality of times, where each application of the imaging technique uses a corresponding different one of the different values. Each application of the imaging technique produces a corresponding image of a subterranean structure. An aggregate of the images is computed to produce an output image of the subterranean structure.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
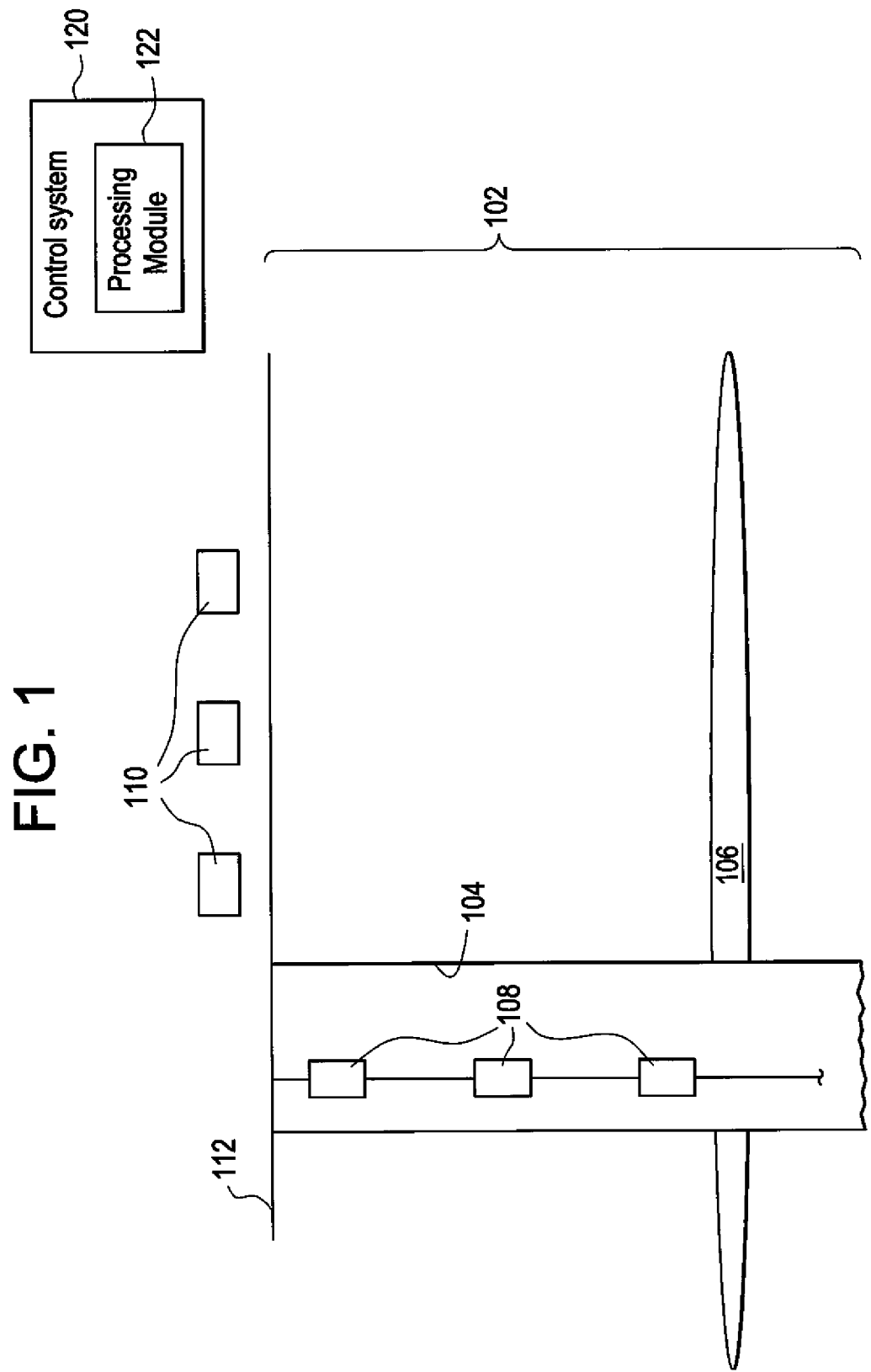
FIG. 1 illustrates an example arrangement for performing seismic data acquisition, in accordance with some embodiments.

FIG. 1 illustrates an example arrangement for performing vertical seismic profiling (VSP), which is a seismic data acquisition, processing, and imaging technique to produce an image of a subterranean structure 102. As depicted in FIG. 1, a wellbore 104 is drilled into the subterranean structure 102, where the subterranean structure 102 can include an element 106 of interest, which can be a hydrocarbon reservoir, a freshwater aquifer, a carbon injection zone, and so forth.

The acquisition system depicted in FIG. 1 includes survey sources and survey receivers. In the context of seismic data acquisition, the survey sources are seismic sources, and the survey receivers are seismic receivers. If the surveying involves electromagnetic (EM) surveying, then the survey sources are EM sources, while the survey receivers are EM receivers. In the example of FIG. 1, survey receivers 108 can be positioned in the wellbore 104, while survey sources 110 are positioned at an earth surface 112 from which the wellbore 104 extends into the subterranean structure 102. Alternatively, survey sources can be provided in the wellbore 104, while survey receivers are provided at the surface 112.

Instead of performing data acquisition and imaging techniques in which survey sources or receivers are positioned in a wellbore, other acquisition and imaging techniques can be used that involve provision of both survey receivers and sources at the earth surface (referred to as surface surveying). Alternatively, crosswell surveying can be performed, in which survey sources are placed in a first wellbore, while survey receivers are placed in a second wellbore. In other implementations, instead of using EM or seismic surveying, acoustic surveying can be employed. In yet further implementations, other forms of surveying can be performed.

FIG. 1 also depicts a control system 120 that has a processing module 122. The processing module 122 is executable in the control system 120 to process survey data collected by the survey receivers 108 for producing an image of the subterranean structure 102 according to some embodiments.

As noted above, one of the challenges associated with performing imaging of a subterranean structure is the selection of values for migration parameters. Migration can be used to move dips and/or other subterranean features to positions that are closer to their true positions in the subterranean structure when survey data (e.g., acquired seismic data or EM data) is rendered to an image.

To perform migration, values of migration parameters (e.g., aperture, dip, azimuth, velocity, etc.) are selected that are determined to best solve an imaging problem under consideration. Although just a few migration parameters are noted above, there are other examples of migration parameters whose values are selected to perform migration. Conventionally, selection of migration parameter values is performed manually by analysts with knowledge of the geology of the subterranean structure 102 and who have the requisite experience. However, such manual techniques are time-consuming and error-prone.

With a complex subterranean environment, the proper selection of migration parameter values is even more challenging. For example, with conflicting dips in the subterranean structure 102, selection of migration parameter values that improve image quality in one direction can lead to deterioration in another direction.

In accordance with some embodiments, instead of relying upon manual selection of migration parameter values, multiple values of each migration parameter are considered to produce corresponding images of the subterranean structure. The images are then aggregated (e.g., averaged) to produce an aggregated image that is likely to be more accurate, without requiring that an analyst has to leverage the analyst's experience and knowledge to estimate the best values for migration parameters.

Figure 2:
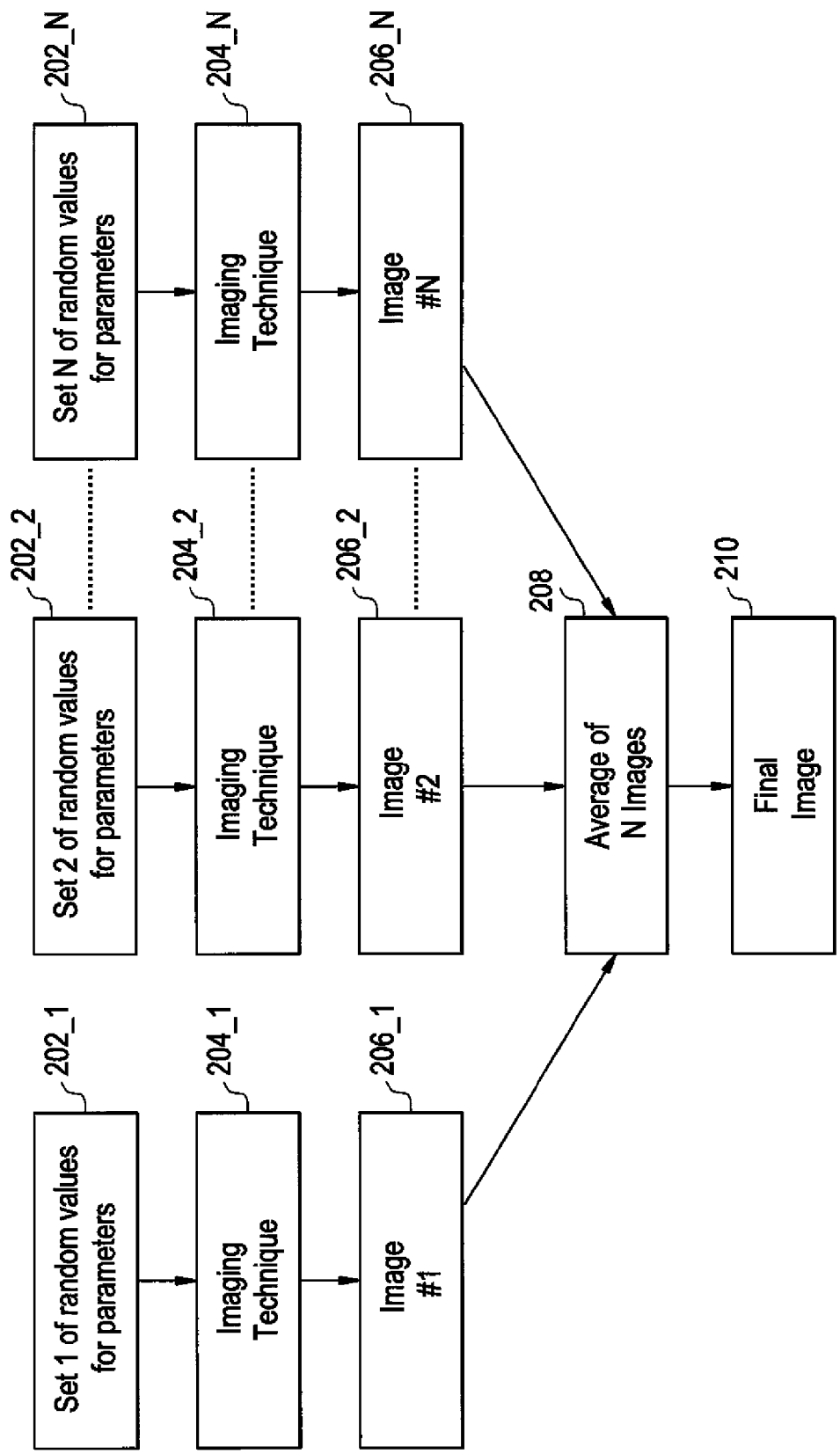
FIG. 2 is a flow diagram of a process according to some embodiments.

A flow diagram of a process performed by the processing module 122 of FIG. 1 is depicted in FIG. 2. The input to the processing module 122 includes multiple sets of different possible values of a collection of migration parameters. As shown in FIG. 2, N (N>1) sets of values are produced (at 202) for a collection of migration parameters. In the example of FIG. 2, the N sets are referenced as 202_1, 202_2, ..., 202_N. In some implementations, the values selected for each set can be random values (produced by a random number generator). Thus, if the collection of migration parameters includes m (m≥1) migration parameters, then each of the N sets includes m random values for the corresponding m migration parameters.

An imaging technique is applied N times, as represented by 204_1, 204_2, ..., 204_N in FIG. 2. Each application of the imaging technique (204_i (i=1 to N)) produces a corresponding image (represented as 206_i) of the subterranean structure 102 based on a corresponding set of migration parameter values. In addition to using the set of migration parameter values, the imaging technique 204_i also produces the image based on the survey data collected by the survey receivers 108 of FIG. 1, which can include survey data for VSP acquisition, surface acquisition, cross-well acquisition, acoustic acquisition, and other type of acquisition.

The N images are then aggregated (at 208) to produce an output image 210. The aggregate of the N images can be an average of the N images. In other implementations, other types of aggregates can be performed, such as a sum of the images, a weighted sum of the images, a median of the images, and so forth.

In some implementations, the selection of the random values for the migration parameters in each set can be based on Monte Carlo random selection of values for the migration parameters. Assuming a Gaussian probability distribution function of imaging parameters at each image point, the average of images from a random set of parameters should result in imaging a subsurface point with the mean parameter value. This can lead to producing an optimum image in some implementations.

Figure 3:
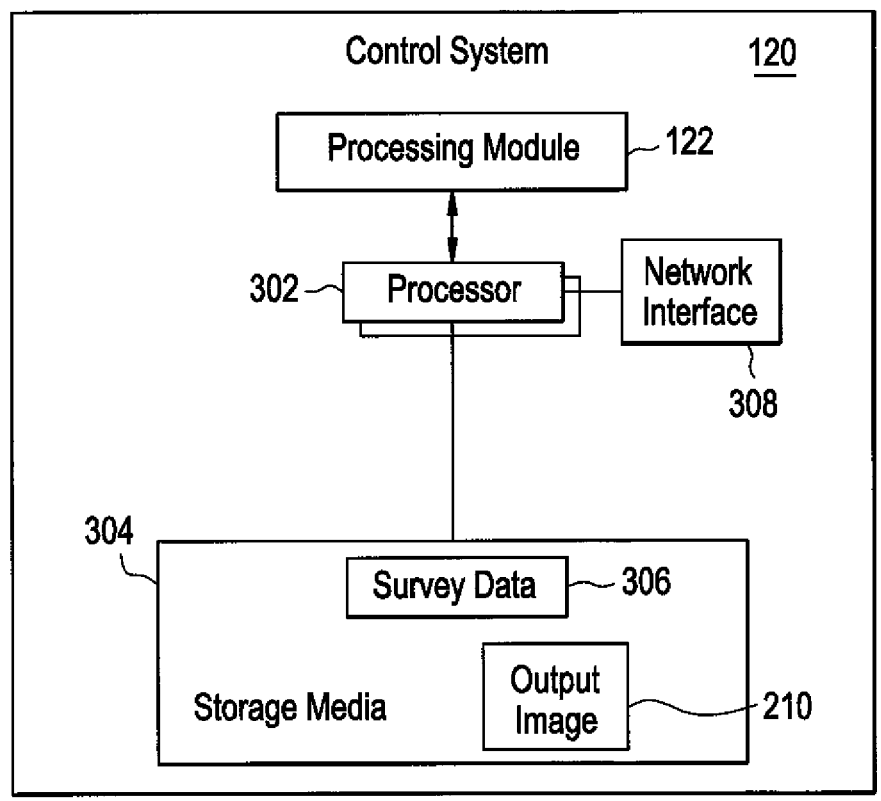
FIG. 3 is a block diagram of an example system incorporating some embodiments.

FIG. 3 depicts an example arrangement of the control system 120, according to some implementations. The processing module 122 is executable on one or multiple processors 302. The processor(s) 302 can be connected to storage media 304, which can store survey data 306 collected by the survey receivers 108 of FIG. 1. The storage media 304 can also store the output image 210 produced by the flow of FIG. 2.

The control system 120 can also include a network interface 308 to communicate over a data network. The network interface 308 allows for receipt of the survey data 306 from a remote source, and transmission of the output image 210 to a remote destination (such as another computer).

The processing module 122 can be implemented as machine-readable instructions that are loaded for execution on the processor(s) 302. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
using a random number generator algorithm to generate a first and second set of migration parameters for vertical seismic profiling imaging;
applying a vertical seismic profiling imaging technique by migration using the first set of migration parameters to a set of seismic data to generate a first image of a subterranean structure;
applying the vertical seismic profiling imaging technique by migration using the second set of migration parameters to the set of seismic data to generate a second image of the subterranean structure;
aggregating, using a system having a processor, the first and second images to generate a third image of the subterranean structure; and
using the third image to identify one or more reservoirs, aquifers, injection zones, or combinations thereof in the subterranean structure.

2. The method of claim 1, wherein aggregating the first and second images comprises averaging the first and second images.

3. The method of claim 1, wherein the migration parameters are selected from a group consisting of: dip, aperture, azimuth, and velocity.

4. The method of claim 1, wherein using the random number generator algorithm to generate the first and second set of migration parameters comprises generating random sets of migration parameters.

5. The method of claim 1, wherein the random number generator algorithm is a Monte Carlo algorithm.

6. The method of claim 1, wherein the set of seismic data comprises collected survey data.

7. A method comprising:
using a random number generator algorithm to generate a first and second set of migration parameters for vertical seismic profiling imaging;

applying a vertical seismic profiling imaging technique by migration using the first set of migration parameters to a set of electromagnetic data to generate a first image of a subterranean structure;

applying the vertical seismic profiling imaging technique by migration using the second set of migration parameters to the set of electromagnetic data to generate a second image of the subterranean structure;

aggregating, using a system having a processor, the first and second images to generate a third image of the subterranean structure; and using the third image to identify one or more reservoirs, aquifers, injection zones, or combinations thereof in the subterranean structure.

8. The method of claim 7, wherein the third image is an average of the first and second images.

9. The method of claim 7, wherein the first and second sets of migration parameters are selected from a group consisting of: a dip parameter, aperture parameter, azimuth parameter, and velocity parameter.

10. The method of claim 7, wherein the first and second sets of migration parameters comprise random migration parameter values.

11. The method of claim 7, wherein the random number generator algorithm is a Monte Carlo algorithm.

12. The method of claim 7, wherein the set of electromagnetic data comprises collected survey data.

13. A method comprising:
using a random number generator algorithm to generate a first and second set of migration parameters for vertical seismic profiling imaging;

applying a vertical seismic profiling imaging technique by migration using the first set of migration parameters to a set of acoustic data to generate a first image of a subterranean structure;

applying the vertical seismic profiling imaging technique by migration using the second set of migration parameters to the set of acoustic data to generate a second image of the subterranean structure;

aggregating, using a system having a processor, the first and second images to generate a third image of the subterranean structure; and using the third image to identify one or more reservoirs, aquifers, injection zones, or combinations thereof in the subterranean structure.

14. The method of claim 13, wherein the third image comprises an average of the first and second images.

15. The method of claim 13, wherein the first and second sets of migration parameters comprise random migration parameter values.

16. The method of claim 13, wherein the set of acoustic data comprises collected survey data.

17. The method of claim 13, wherein the random number generator algorithm is a Monte Carlo algorithm.

* * * * *